(12) United States Patent
Hillman et al.

(10) Patent No.: US 6,216,074 B1
(45) Date of Patent: Apr. 10, 2001

(54) METHOD FOR DETERMINING THE FILL TIME OF A TRANSMISSION CLUTCH

(75) Inventors: Jonathan R. Hillman, Morton; Danial P. Simon, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/183,648

(22) Filed: Oct. 30, 1998

(51) Int. Cl.[7] .............................. G06F 7/00; G06F 17/00; G06F 19/00
(52) U.S. Cl. ................... 701/51; 701/55; 701/56; 701/58; 74/731.1; 192/87.14; 477/130; 477/143; 477/70
(58) Field of Search .................... 701/51, 55, 56, 701/58; 74/731.1; 192/87.14; 477/70, 130, 143

(56) References Cited

U.S. PATENT DOCUMENTS

| 4,982,620 | | 1/1991 | Holbrook et al. ............... 74/731.1 |
| 5,036,729 | * | 8/1991 | Nitz et al. ......................... 74/866 |
| 5,282,401 | * | 2/1994 | Hebbale et al. .................. 74/866 |
| 5,445,576 | * | 8/1995 | Motamedi et al. ............... 477/105 |
| 5,449,329 | | 9/1995 | Brandon et al. ................. 477/70 |
| 5,468,198 | | 11/1995 | Holbrook et al. ............... 477/143 |
| 5,514,047 | * | 5/1996 | Tibbles et al. .................. 477/46 |
| 5,551,930 | | 9/1996 | Creger et al. ................... 477/130 |
| 5,580,332 | | 12/1996 | Mitchell et al. ................. 477/143 |
| 5,853,076 | | 12/1998 | McKee et al. ................... 192/87.14 |

FOREIGN PATENT DOCUMENTS 198 26 097    12/1999   (DE).

* cited by examiner

Primary Examiner—William A. Cuchlinski, Jr.
Assistant Examiner—Ronnie Mancho
(74) Attorney, Agent, or Firm—Haverstock, Garrett & Roberts

(57) ABSTRACT

A method for controlling the fill time of an oncoming transmission clutch of a vehicle within a predetermined range of speed conditions is disclosed, the method including the steps of: (a) sensing an engine speed within the predetermined range; (b) reading an incremental pulse time value corresponding to the speed sensed in step (a); and (c) determining an adjusted pulse time value using the incremental pulse value read in step (b) and a predetermined nominal pulse time value.

9 Claims, 3 Drawing Sheets

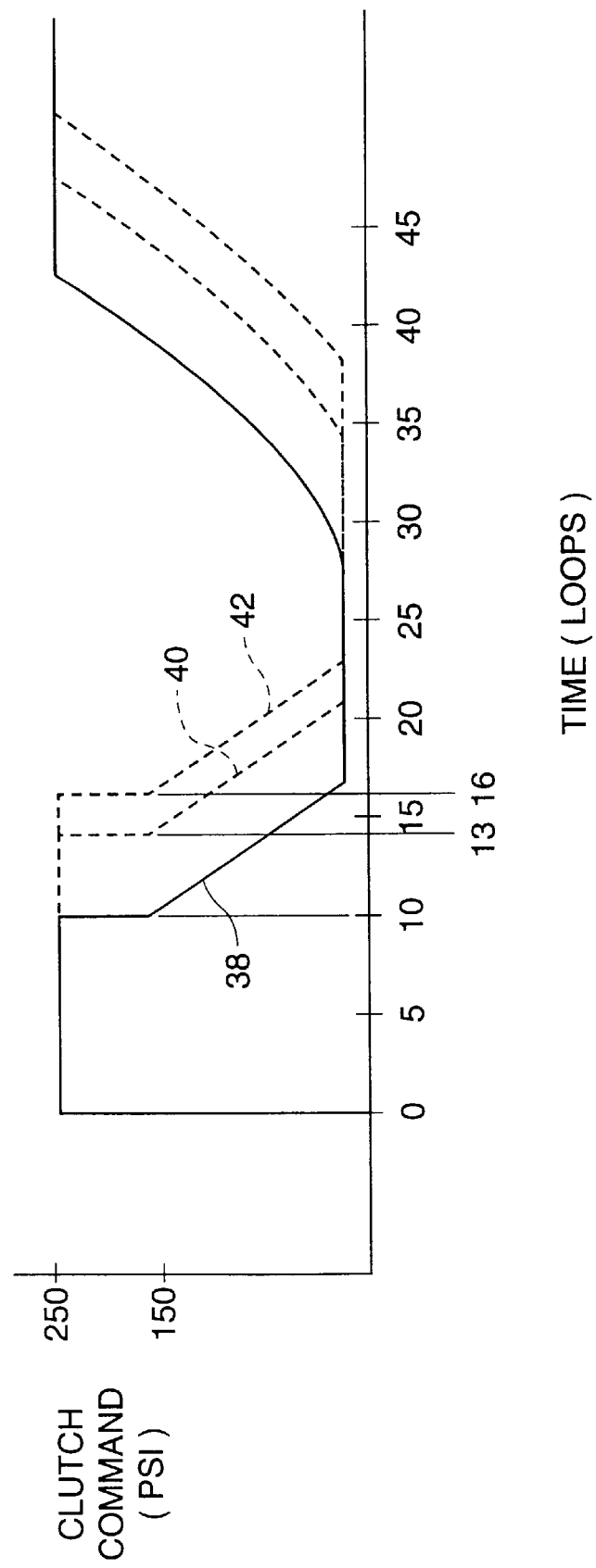

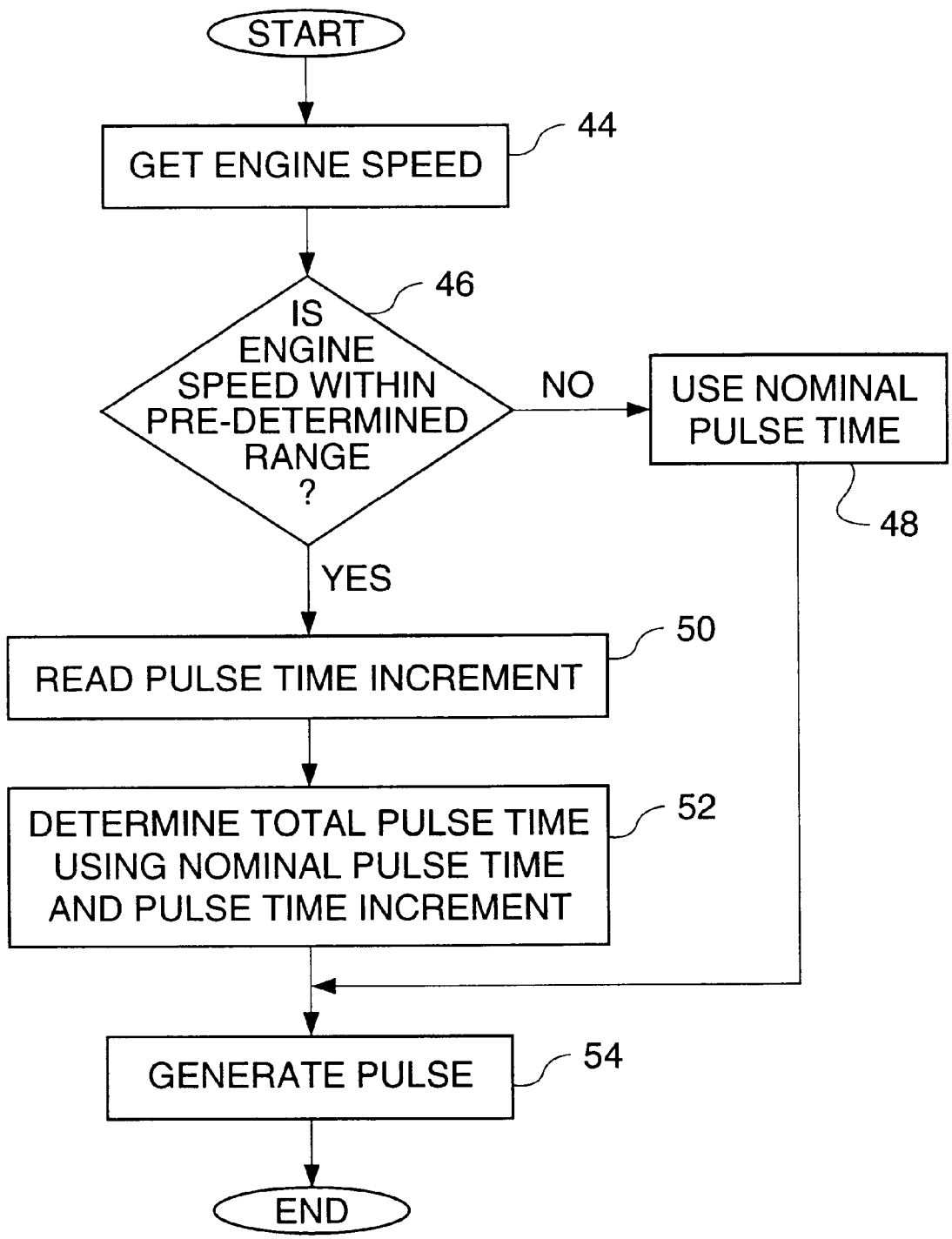

METHOD FOR DETERMINING THE FILL TIME OF A TRANSMISSION CLUTCH

TECHNICAL FIELD

This invention relates generally to a method of transmission control and, more particularly, to a method of determining the fill time of an on-coming clutch under predetermined engine speed conditions.

BACKGROUND ART

Generally, a power shift transmission includes a number of gear elements coupling the input and output shafts, and a related number of clutches which are selectively engagable to activate gear elements for establishing a desired speed ratio between the input and output shafts. The clutch may be of the band type or the disk type.

For example, the input shaft may be connected to the engine through a fluid coupling, such as a torque converter, and the output shaft is connected directly to the vehicle drive. Shifting from one gear ratio to another involves releasing or disengaging the off-going clutches associated with the current gear ratio and applying or engaging the on-coming clutches associated with the desired gear ratio.

To improve the shifting of the transmission, electronic control technology is commonly used, wherein a direct interface between an electronic control unit and the clutches is provided via a plurality of clutch fill control elements such as solenoid valves. The solenoid valves are modulated to control both the on-coming and off-going clutch pressures in response to input pulses from the electronic control unit.

To provide for precise timing of the shifting, it is desirous to determine the fill time of an on-coming clutch. The fill time is the time required to fill an on-coming clutch cavity with fluid.

Various clutch control systems and strategies for filling on-coming clutches are known. Reference, for instance, Brandon et al U.S. Pat. No. 5,449,329 issued Sep. 12, 1995 to Deere & Company; Holbrook et al U.S. Pat. No. 5,468,198 issued Nov. 21, 1995 to Chrysler Corporation; Creger et al U.S. Pat. No. 5,551,930 issued Sep. 3, 1996 to Caterpillar, Inc.; and Mitchell et al U.S. Pat. No. 5,580,332 issued Dec. 3, 1996 to Caterpillar, Inc.

Commonly, fill strategies involve first pre-filling the clutch at a high fill pressure to a level just below that required to fully engage the clutch, ramping down the pressure to a lower pressure, holding the lower pressure, then gradually increasing the pressure again to the high level to fully engage the clutch. The volume of the clutch cavity is a known constant. However, the fluid flow rate to the clutch has been found to vary with the hydraulic system pump speed, which is a function of the engine speed. Since engine speed varies widely, typically at least two predetermined nominal pre-fill times are used, including a longer nominal pre-fill time for low speed ranges, and a shorter nominal pre-fill time for higher speed ranges. At the higher and lower engine speeds for which the nominal pre-fill times were selected, shifting is generally smooth and satisfactory. However, when shifting at engine speeds between the higher and lower ranges for which the nominal pre-fill times were selected, the shorter pre-fill time is used so as to not fully fill the clutch during the pre-fill period. In many cases at these intermediate engine speeds, particularly when downshifting under coasting conditions and the like, the shift is rougher and/or more jerky than desired. This has been found to be due to inadequate pre-filling of the clutch, as a result of a low fluid flow rate thereto.

Accordingly, the present invention is directed to overcoming one or more of the problems as set forth above.

DISCLOSURE OF THE INVENTION

In one aspect of the present invention, a method for controlling the fill time of an on-coming transmission clutch of a vehicle within a predetermined range of speed conditions is disclosed, the method including the steps of:

(a) sensing an engine speed within the predetermined range;

(b) reading an incremental pulse time value corresponding to the speed sensed in step (a); and (c) determining an adjusted pulse time value using the incremental pulse time value read in step (b) and a predetermined nominal pulse time value.

BRIEF DESCRIPTION OF THE DRAWINGS

FIG. 2 is a timing chart illustrating clutch commands for shifts at different engine speeds within a predetermined speed range; and FIG. 3 is a high-level flow chart for control of the system of FIG. 1.

BEST MODE FOR CARRYING OUT THE INVENTION

Figure 1:
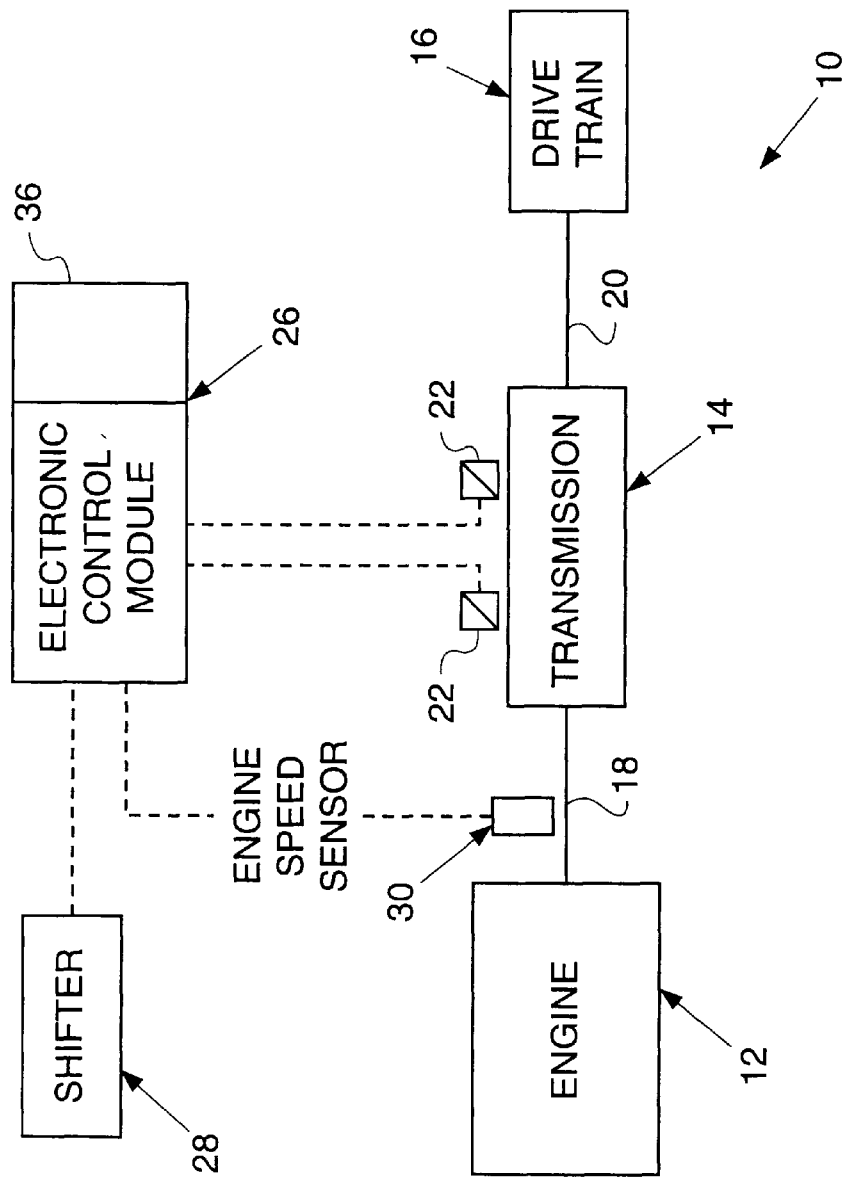
FIG. 1 is a block diagram of an electronic control system of a vehicle including a transmission.

Referring now to the drawings, FIG. 1 illustrates an electronic control system 10 of a vehicle that includes an internal combustion engine 12, a multi-speed fluid operated power transmission 14, and a drive train 16. Engine 12 is connected to transmission 14 via a torque converter (not shown) and an input shaft 18. Transmission 14 is connected to drive train 16 via an output shaft 20. Transmission 14 is of conventional construction and operation including a plurality of clutches (not shown), each clutch being actuated by hydraulic pressure and upon engagement, requiring a fill time before torque is transmitted between a driving and a driven friction element. That is, the fill time is the elapsed time for a clutch piston to move from the released to the engaged position. Each clutch is selectively engaged and disengaged by a clutch fill control element, here being a solenoid operated proportional pressure control valve 22. Each solenoid operated proportional pressure control valve 22 is of conventional construction and operation to maintain a flow of fluid to the respective clutch sufficient to maintain a clutch pressure proportional to a current transmitted to the valve 22. The hydraulic circuit of transmission 14 includes a pump that supplies pressurized hydraulic fluid from a sump or reservoir (not shown) to the clutches through the control valves 22, the flow rate of the fluid being at least partially dependent on engine speed.

An electronic control module 26 receives inputs from input devices such as an operator controlled shifter 28 and an engine speed sensor 30, and responsively controls the operation of control valves 22. Electronic control module 26 can also receive various other input signals representative of vehicle system parameters in the conventional manner. Electronic control module 26 comprises a number of conventional devices including a microprocessor with an internal clock and a memory device 36, an input/output device, and an array of proportional solenoid current drivers, one driver devoted to each control valve 22. The microprocessor is operable to deliver a command signal proportional to the desired solenoid current, and the current driver uses a pulse width modulated voltage or other means to produce the desired current to the respective control valves 22. Because control valves 22 are each operable to maintain a clutch pressure proportional to the solenoid current, the microprocessor is thus operable to control the clutch pressure proportional to the command signal delivered to the solenoid driver circuit.

Generally, a shift command sequence for engaging or modulating an oncoming clutch can be divided into several segments. The first is a pre-fill command for a constant, relatively high clutch pressure sufficient to pre-fill the clutch to a desired level just marginally less than that required for engagement. A ramp down command wherein the clutch pressure is gradually decreased from that of the pre-fill command follows. Then, the clutch pressure is maintained or held at a predetermined low pressure condition for a prescribed amount of time, and subsequently is gradually ramped up for smooth engagement of the clutch. Each of the pre-fill, ramp down and ramp up segments of the command pulse is adjustable based on any of a variety of operating parameters, including engine speed, load, and the like. Typically, two pulse time durations for the clutch pre-fill segment are used, a first being a longer pulse time duration which is used at slower engine operating speeds, for instance, 700 rpm and below, to reflect the longer period of time required to pre-fill the clutch to the desired level under the low engine speed conditions. At higher engine speeds, a shorter pre-fill pulse time duration is used, as fluid flow rates are generally higher at the greater engine speeds such that it takes a shorter period of time to fill the clutch to the desired level. For instance, a pulse time duration known to fill the clutch to the desired level of an engine speed of about 2400 rpm can generally be used for a wide range of higher engine speed conditions for some applications. It has been found, however, that for a range of engine speed conditions intermediate the low speed conditions wherein the longer pulse time duration works satisfactorily and the higher engine speed conditions wherein the shorter pulse time duration is satisfactory, particularly when downshifting during coasting, neither of these pulse time durations work well. In the instance of the latter shorter pulse time duration, it has been found that the clutch is inadequately pre-filled, resulting in jerky engagement and other problems.

To overcome the above discussed problem, the present invention uses a map of incremental pulse time values for a predetermined range of intermediate engine speeds stored in memory device 36 and readable by the microprocessor of control module 26. Control module 26 is operable to monitor engine speed signals received from speed sensor 30, along with other operating parameters, if desired. When an engine speed within the predetermined range is detected, the microprocessor reads the map to determine the incremental pulse time value corresponding to that speed. The microprocessor then determines an adjusted pulse time value using the incremental pulse time value read and a nominal pulse time value. Here, the preferred determination is made by adding the incremental pulse time value read,and a nominal pulse time value which corresponds to the predetermined shorter value for higher engine speeds discussed above.

As an example, the present method may be used in an application wherein neither the long nominal pulse time value for low engine speed conditions or the shorter nominal pulse time value for higher engine speed conditions is satisfactory between engine speeds of between about 800 and 1500 rpm. Table 1 shows one possible map of incremental pulse time values expressed in ten millisecond loops for engine speeds from 800 to 1500 rpm in 100 rpm increments.

TABLE 1

| Incremental pulse time value $t_n$ (in 10 millisecond loops) | Engine Speed n (in RPM) |
| --- | --- |
| 1 | 1500 |
| 2 | 1400 |
| 3 | 1300 |
| 4 | 1200 |
| 5 | 1100 |
| 6 | 1000 |
| 7 | 900 |
| 8 | 800 |

An adjusted pulse time value $t_{adjusted}$ for an engine speed n can be determined and a corresponding operating pulse delivered to the selected control valve 22 to provide a pre-fill time sufficient for pre-filling the clutch to the desired extent at the engine speed in accordance with the following equation:

$$t_{adjusted} = t_{nominal} + t_n \qquad \text{Equation 1}$$

where: $t_{nominal}$=the nominal pulse time value; and $t_n$=the incremental pulse time value.

Referring to FIG. 2, a chart of clutch commands in psi versus time in loops using Table 1 and Equation 1 is shown. Curve 38 represents the clutch commands for an engine speed of 1500 rpm; curve 40 represents clutch commands for an engine speed of 1200 rpm; and curve 42 represents clutch commands for an engine speed of 900 rpm. Preferably, the nominal pulse time value is 9 loops. Examining FIG. 2, it can be seen that the pre-fill clutch command segment of curve 38 for 1500 rpm is (9+1=10 loops) and is shorter than curve 40 for 1200 rpm (9+4=13 loops), and both are shorter in time than the pre-fill segment for the 900 rpm speed (9+7=16 loops), each of the times being reflective of the actual time required to pre-fill the clutch under the respective engine speed conditions. Note however that for curves 38, 40 and 42, the ramp down segments hold time segments, and ramp up time segments for engaging the clutch remain the same. Here, it should also be noted that although in Table 1 engine speed n is in uniform 100-rpm increments, the increments could likewise have larger or smaller uniform or non-uniform values. Further, sensed engine speeds can be rounded up, or down, as desired, to the closest stored engine speed value. Likewise, the incremental pulse time value $t_n$ changes a uniform 1 loop for each 100-rpm change in engine speed. However, the incremental pulse time could have a non-uniform rate of change.

Turning to FIG. 3, a high level flow chart for operation of the above described electronic control system is shown. In block 44 control module 26 receives an engine speed signal from sensor 30. In block 46 control module 26 determines whether the engine speed is within the predetermined range wherein the nominal pre-fill pulse time or times provide unsatisfactory shifting. If not, as shown in block 48, the appropriate nominal pulse time is used to generate a control pulse to the appropriate control valve 22. If engine speed is within the predetermined range, control module 26 reads the pulse time increment for the engine speed in memory device 36, as shown by block 50. Then, as shown in block 52, control module 26 determines the total pulse time using the nominal pulse time and the pulse time for the speed read from memory device 36, and generates the corresponding control pulse to control valve 22, as shown in block 54.

Industrial Applicability

The present method for determining the fill time of a transmission clutch has applicability for a wide range of vehicular applications, including, but not limited to, automotive and truck applications. The method according to the present invention has been found to provide smoother, better shifting under a wide range of intermediate speed conditions, particularly when down shifting under coasting conditions is required.

Other aspects, objects and advantages of the present invention can be obtained from a study of the drawings, the disclosure and the appended claims.

What is claimed is:

1. A method for controlling the fill time for a transmission clutch of a vehicle responsive to engine speeds, the vehicle including a clutch fill control element, a sensor operable for generating a speed signal, a processor operable for receiving the speed signal and delivering an operating pulse to the clutch fill control element, and a memory device including a stored set of incremental pulse time values readable by the processor and corresponding to speeds within a predetermined range, the method comprising:

(a) sensing a speed representative of an engine speed within the predetermined range;

(b) reading from the memory the stored incremental pulse time value corresponding to said sensed speed;

(c) determining an adjusted pulse time value as a combination of said stored incremental pulse time value and a predetermined nominal pulse time value; and (d) delivering an operating pulse to the clutch fill control element corresponding to the adjusted pulse time value.

2. The method, as set forth in claim 1, wherein the predetermined range of speeds comprises a range of engine speeds.

3. The method, as set forth in claim 2, wherein the range of engine speeds comprises from about 800 rpm to about 1500 rpm.

4. The method, as set forth in claim 2, wherein the range of engine speeds comprises engine speeds of from about 800 rpm to about 2400 rpm.

5. The method, as set forth in claim 1, where in step (c) the adjusted pulse time value is determined by adding the incremental pulse time value read in step (b) to the predetermined nominal pulse time value.

6. The method, as set forth in claim 1, wherein the fill time is a time required to pre-fill the clutch prior to engagement thereof.

7. The method, as set forth in claim 1, wherein the clutch fill control element comprises a solenoid controlled valve.

8. The method, as set forth in claim 1, comprising a further step prior to step (d) of determining that the vehicle is in a predetermined operating mode.

9. The method, as set forth in claim 8, wherein the predetermined operating mode is a coasting mode.

* * * * *